US011389998B2

(12) United States Patent
Braun et al.

(10) Patent No.: US 11,389,998 B2
(45) Date of Patent: Jul. 19, 2022

(54) HOT CHANNEL DEVICE

(71) Applicant: EWIKON HEISSKANALSYSTEME GMBH, Frankenberg (DE)

(72) Inventors: Peter Braun, Hungen (DE); Stefan Eimeke, Frankenberg (DE)

(73) Assignee: EWIKON HEISSKANALSYSTEME GMBH, Frankenberg (DE)

( * ) Notice: Subject to any disclaimer, the term of this patent is extended or adjusted under 35 U.S.C. 154(b) by 103 days.

(21) Appl. No.: 17/046,159

(22) PCT Filed: Apr. 3, 2019

(86) PCT No.: PCT/EP2019/058384
§ 371 (c)(1),
(2) Date: Oct. 8, 2020

(87) PCT Pub. No.: WO2019/197238
PCT Pub. Date: Oct. 17, 2019

(65) Prior Publication Data
US 2021/0031420 A1 Feb. 4, 2021

(30) Foreign Application Priority Data
Apr. 12, 2018 (DE) .......................... 102018108659.8

(51) Int. Cl.
*B29C 45/27* (2006.01)
*B29C 45/28* (2006.01)

(52) U.S. Cl.
CPC ...... *B29C 45/2737* (2013.01); *B29C 45/2806* (2013.01); *B29C 2045/2753* (2013.01)

(58) Field of Classification Search
CPC ............ B29C 45/2737; B29C 45/2806; B29C 2045/2753
See application file for complete search history.

(56) References Cited

U.S. PATENT DOCUMENTS 6,162,044 A 12/2000 Babin
7,824,176 B2 11/2010 Braun
(Continued)

FOREIGN PATENT DOCUMENTS

DE 202006012676 U1 8/2007
DE 202009004786 U1 9/2010
(Continued)

OTHER PUBLICATIONS

Search Report issued in Int'l Appl. No. PCT/EP2019/058384 (2019).
(Continued)

*Primary Examiner* — James Sanders
(74) *Attorney, Agent, or Firm* — Barnes & Thornburg LLP

(57) ABSTRACT

A hot channel device for guiding an incoming hot melt, in particular a plastic melt, to a gate opening of a mould insert of a tool, which gate opening can be opened and closed again by a movable needle, wherein the hot channel device has a first hot channel region, with a coolable melt transfer region, and a second hot channel region, which are arranged one behind the other in the flow direction of the melt toward the mould insert, wherein the coolable melt transfer region has a melt transfer chamber, which is penetrated by the needle, said needle being guided displaceably in a needle channel so as to be sealed by a needle seal, and the needle channel continues in an aligned manner in a melt channel of the second hot channel region.

25 Claims, 5 Drawing Sheets

(56) References Cited

U.S. PATENT DOCUMENTS

| | | |
|---|---|---|
| 8,899,963 B2 | 12/2014 | Braun |
| 9,296,141 B2 | 3/2016 | Manz |
| 2002/0106419 A1 | 8/2002 | Sattler et al. |

FOREIGN PATENT DOCUMENTS

| | | |
|---|---|---|
| DE | 10084280 | 3/2014 |
| DE | 102014107643 | 12/2015 |
| EP | 1223018 | 7/2002 |
| EP | 2427317 | 3/2012 |
| EP | 2892704 | 7/2015 |
| JP | H07-100863 | 4/1995 |
| JP | 2001-145944 | 5/2001 |
| WO | WO 2007/017187 | 2/2007 |
| WO | WO 2007/115969 | 10/2007 |
| WO | WO 2012/037682 | 3/2012 |

OTHER PUBLICATIONS

Search Report issued in German Application No. 102018108659.8 (2019).

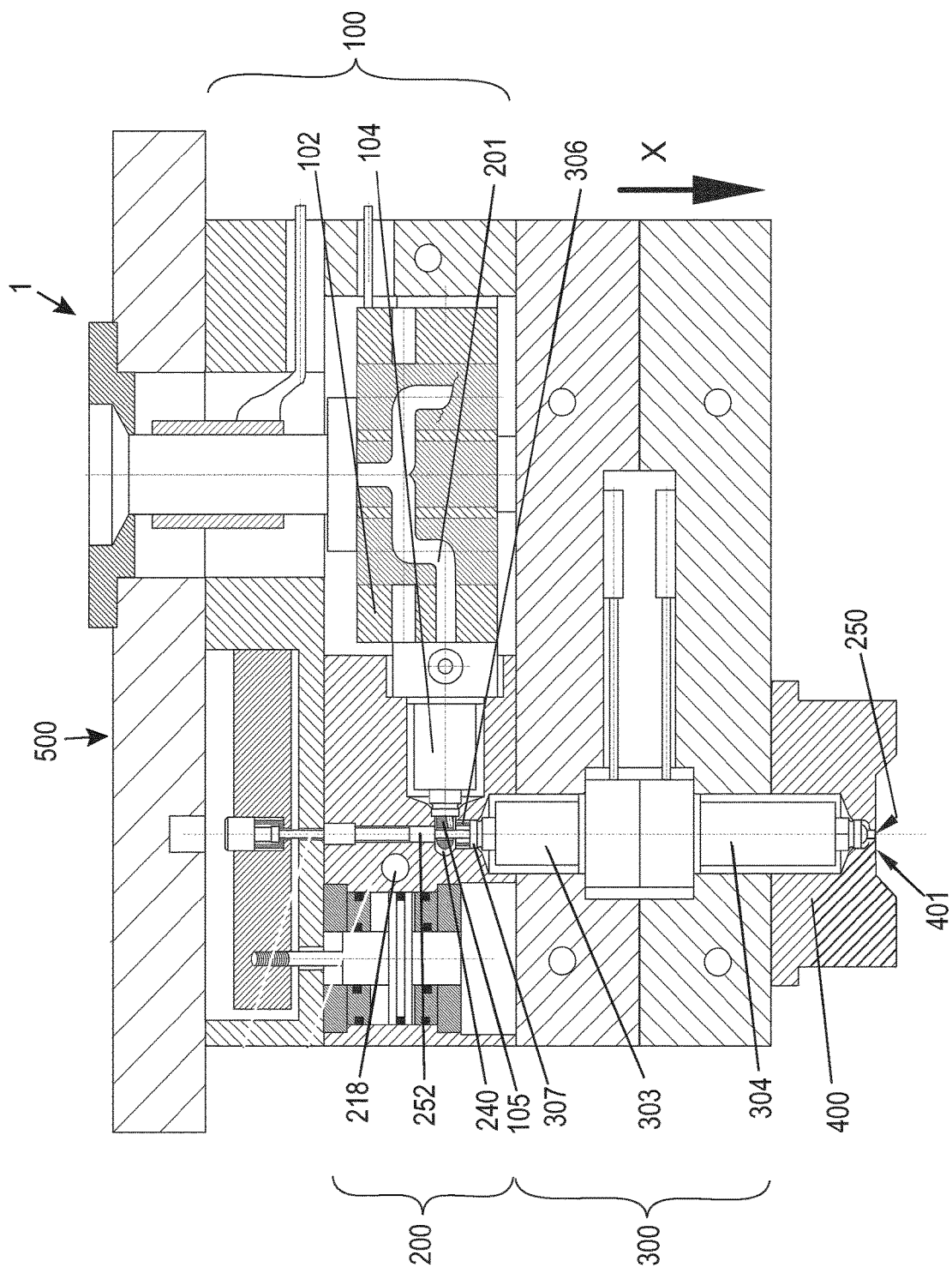

HOT CHANNEL DEVICE

CROSS-REFERENCE TO RELATED APPLICATIONS

This application is a U.S. nationalization under 35 U.S.C. § 371 of International Application No. PCT/EP2019/058384, filed Apr. 3, 2019, which claims priority to German Patent Application No. 10 2018 108 659.8, filed Apr. 12, 2018. The disclosures set forth in the referenced applications are incorporated herein by reference in their entireties.

The present disclosure is directed generally to a hot channel device for conveying incoming hot melt to a gate opening of a mold.

BACKGROUND OF THE DISCLOSURE

Hot channel devices typically have a movable needle (also known as a shut-off needle) which is used to open and close a gate opening. In such valve gate hot channel applications, the general task is to guide the needle movably in the melt channel, which is usually under high pressure and high temperature (200 MPa and more as well as >200° C.), and still keep it securely sealed with sealing elements.

The known prior-art embodiments are characterized in that the sealing elements (needle seal) are arranged (mounted) in the hot areas of the hot channel components such as manifolds or nozzles, see WO 2007/017187 A1, EP 2 892 704 B1 and WO 2012/037682 A2.

Needle seals for needles of hot channel devices are usually designed as gap seals when processing polymer melts for the injection-molding process. In this case, the gap seal is designed as a kind of sleeve of a specified length which is inserted into an annular space between the moving needle and an inner wall of a bore of a heated melt-conducting component, for example a manifold. This means that a small amount of material flow (leakage) can take place between the pressure chamber and the atmosphere by means of a suitably selected clearance between the bore of the sealing element and the outer diameter of the needle, as well as a sufficiently selected length of the sealing passage. However, the material leakage or loss that occurs in this case is generally considered acceptable (approx. 1 to 50 g/a) due to the typically high viscosity level of polymer melts.

However, it is precisely the requirement for low or minute leakage quantities that leads to long residence times of the polymer material in the sealing gap. This often results in carbonization of the polymer under pressure, temperature and time with the disadvantage that the gap "grows" due to the formation of carbon deposits and at least impedes needle movement, or in extreme cases is even blocked because the driving force is no longer sufficient to move the needle. Since it is the basic function of the needle to open and close the gate opening as an active element in the injection cycle, the cyclical back and forth movement of the needle can drag parts of the degraded (cracked) polymer into the melting chamber, resulting in defective plastic components with optical defects (streaks) or with mechanical defects due to the inclusion of particles (degraded, carbonized polymer).

The present disclosure addresses the mentioned shortcomings of the prior art. Known are hot channel sealing concepts which have shifted the needle seals into a tempered part of a forming tool, see DE 20 2006 012 676 U1 or the WO 2007/115969 A1. This "cold needle seal" concept has the advantage that no carbonization takes place and a practically leakage-free sealing situation is created in which the polymer entering during initial start-up acts as an additional gap filling and the thin polymer layer acts as a sealing and sliding film. This also minimizes wear between seal and needle. However, the solutions of this prior art can only be used to a limited extent, since the direction of the needle movement cannot take place in the usual axis of the mold opening movement.

According to DE 20 2009 004 786 U1 and EP 2 427 317 B1, on the other hand, although the direction of needle movement corresponds to the mold opening movement, the needle seal must always be placed directly in the mold insert, which limits general applications of the "cold needle seal".

According to the present disclosure, a hot channel device is provided for conveying incoming hot melt, in particular a plastic melt, to a gate opening of a mold insert of a tool, which can be opened and closed again by a movable needle, wherein the hot channel device has a first hot channel region, a coolable melt transfer region and a second hot channel region, which are arranged one behind the other in the flow direction of the melt in the direction of the mold insert, wherein the coolable melt transfer region has a melt transfer chamber which is penetrated by the needle, which is displaceably guided in a needle channel which is sealed by a needle seal, and the needle channel is continued in alignment in a melt channel of the second hot channel region, preferably up to the gate opening.

The present disclosure also is directed to a method for operating a hot channel device, wherein the hot channel device comprises a tool with a first heated hot channel region with a melt channel, with an adjoining cooled melt transfer region with a needle seal with a melt channel and with an adjoining second heated hot channel region with a melt channel, which are arranged one behind the other in the flow direction of the melt in the direction of a mold insert, in particular for operating a hot channel device, wherein during injection molding a melt is fed into the hot channel device and through this to the mold insert, a) the first hot channel region is tempered above the glass transition temperature or above the crystallite melting temperature of the melt, b) and the subsequent melt transfer region is tempered below the glass transition temperature or below the crystallite melting temperature of the melt, wherein a flow passage for the melt is maintained in the melt channel, c) and the subsequent second hot channel region is tempered above the glass transition temperature or above the crystallite melting temperature of the melt.

This ensures in each case that the principle of the "cold needle seal" can be used in hot channel systems to a greater extent than was the case in the cited prior art. This is because the melt transfer region is tempered in such a way that, in particular in the sealing gaps on the needle seal, a temperature prevails which, suitably tempered, is below the glass transition temperature or below the crystallite melting temperature of the melt.

It may preferably be provided that the coolable melt transfer region is tempered by direct or indirect cooling so that a temperature prevails in the sealing gaps of the needle seal which is more than more than 15° C., in some embodiments more than 40° C., and in some embodiments more than 60° C. below the glass transition temperature or below the crystallite melting temperature of the melt. The temperature in the melt transfer region is particularly preferred to be in the range of or below the continuous operating temperature of the plastic to be processed for the melt. In this way, the disclosed device and method can be put into practice with good results.

It may be further provided that the melt transfer region is tempered so that a solidifying plastic layer forms on the inner wall of the melt transfer chamber and in the transition to the sealing gap on the needle seal towards the needle and towards the needle channel during operation, leaving a flow passage for the melt into the second hot channel region. For the implementation of the latter effect, a melt conducting element of the first hot channel region can protrude into the melt transfer chamber, which controls a temperature in the melt channel for the melt to flow through the melt transfer chamber.

These respectively further developed concepts of the "cold needle seal" have the advantage that no carbonization can take place in the sealing gaps and a practically leakage-free sealing situation is created in which the polymer entering during initial start-up acts as an additional gap filling and the thin polymer layer acts as a sealing and sliding film. This also minimizes wear between the needle seal and the needle.

The needle seal can be mounted in any area of the mold which can serve as a melt conducting area, since a lateral melt transfer takes place into a melt-conducting hot channel component, into which preferably both a heat conducting element of a hot channel element to be fed of the first hot channel region and a melt-conducting hot channel component of the second hot channel region open, wherein the needle seal is adjacent to this chamber.

It may also advantageously be provided that the melt in the first hot channel region is directed from a first direction X into the melt supercompartment, in particular deflected at 90°, and leaves it again, in particular deflected at 90°, in direction X to the second hot channel region. It may be further preferably provided that the direction X is the mold opening direction. With this further development of the invention, the needle guided through the "cold needle seal" can be guided unhindered through the second hot channel region—in particular through a hot channel element conveying the melt and a further hot channel nozzle up to the gate opening, and the needle movement can thus take place without restriction in mold opening direction X.

All in all, the principle of the "cold needle seal" becomes particularly universally usable in this way, since every cavity can be reached in the usual way with the additional second hot channel nozzle.

In some embodiments, the second hot channel region has at least one heated hot channel nozzle to keep the melt at a sufficiently high temperature to prevent solidification of melt and keep it positively fluid.

In some embodiments, the inlet of the melt transfer chamber is oriented at an angle of 10° to 90°—in particular at right angles—to a mold opening direction, so that lateral melt transfer from the first hot channel region into the melt transfer chamber takes place and that the melt channel of the second hot channel region and the needle movement direction are oriented parallel to or in the mold opening direction.

In some embodiments, a melt conducting element of the first hot channel region protrudes into the melt transfer chamber without touching the wall of the latter, in order to keep a passage free for the melt to pass through by means of a sufficiently high temperature at the melt conducting element.

In some embodiments, a sliding seal is provided between the melt transfer chamber and the rear hot channel component—especially the hot channel nozzle.

In this case, the melt conducting element of the first hot channel region can be designed to be interchangeable.

In the following, the disclosed device and method are explained in more detail by reference to various exemplary embodiments with reference to the drawings. These exemplary embodiments relate to preferred embodiments of the invention, but do not represent them conclusively in all possible variants. Rather, within the scope of the claims, numerous modifications and equivalents of the depicted figures not shown are also possible.

BRIEF DESCRIPTION OF THE DRAWINGS

FIG. 4a shows a section of another hot channel device according to the present disclosure; and FIG. 4b shows a detail enlargement from FIG. 4a.

DETAILED DESCRIPTION OF THE DRAWINGS

Figure 1:
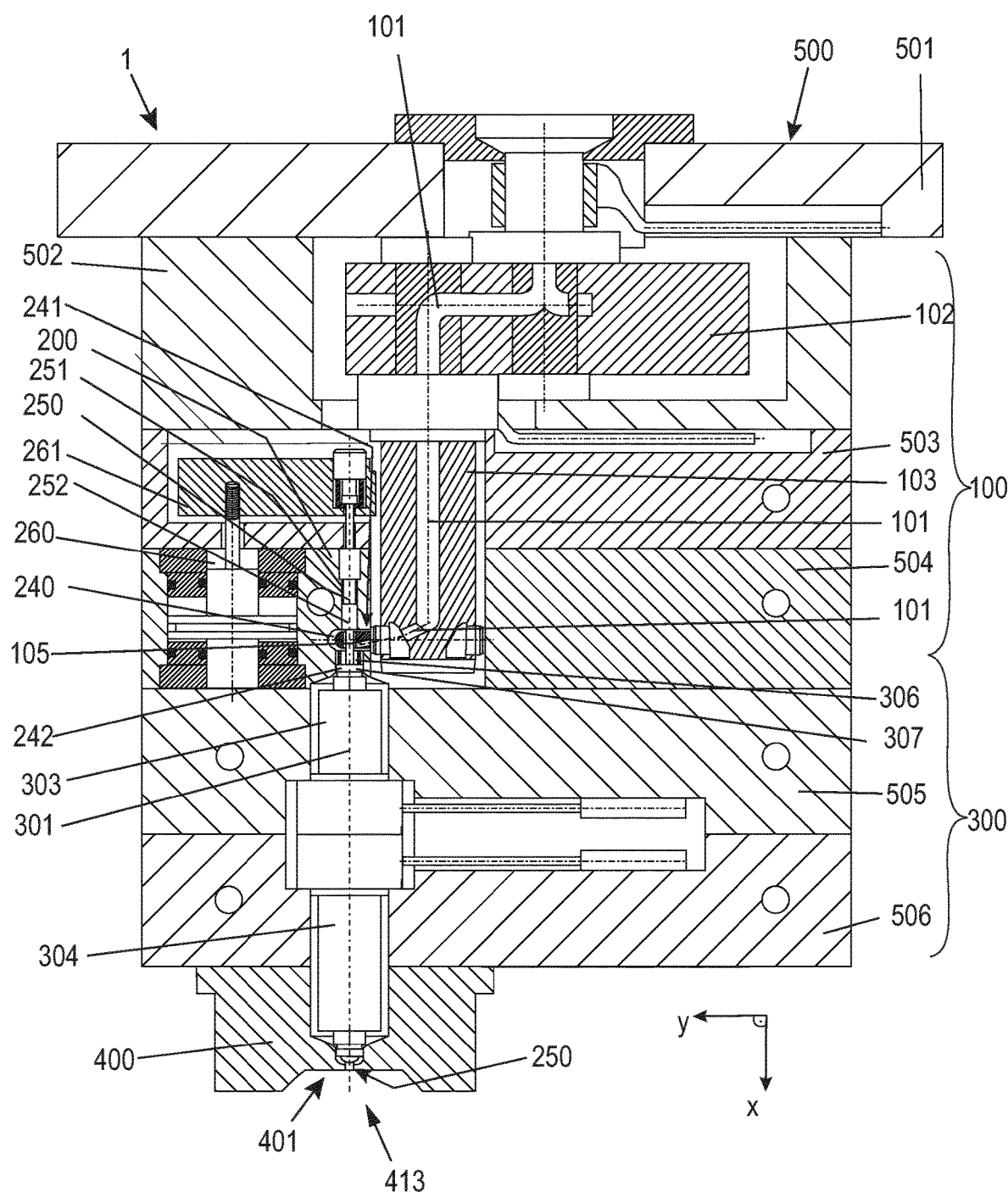
FIG. 1 shows a section of a first hot channel device according to the present disclosure with three hot channel regions.

FIGS. 1 to 4a and 4b show different hot channel devices 1. The hot channel devices 1 shown are each used to direct incoming hot melt to a gate opening 401 of a mold insert 400. This melt—which may be a plastic melt—is fed from an injection-molding machine (not shown here) directly or, optionally, via further hot channel components (not shown here) upstream of the hot channel device shown, to hot channel device 1 shown in FIG. 1, 2, 3 or 4.

The hot channel device 1 has a first hot channel region 100, a melt transfer region 200 and a second hot channel region 300. These areas 100, 200, 300 are arranged one behind the other in the direction of flow of the melt towards the mold insert 400. The elements of the regions 100, 200, 300 are held together by one or more plates 501, 502, 503, 504, 505, 506 of mold 500.

The first and second hot channel regions 100 and 300 as well as the melt transfer region 200 each serve to transfer the melt. They differ, however, among other things in their operating temperature, i.e. the wall temperature.

In the hot channel regions 100 and 300, this is usually above 200° C., for example at a pressure of 200 MPa or more.

In the first hot channel region 100 and in the second hot channel region 300, the temperature is selected in such a way that the respective incoming melt remains well fluid and does not cool and solidify on any walls.

In the melt transfer region 200, on the other hand, the temperatures can be lower in certain areas, especially in the peripheral area of a melt transfer chamber, as will be discussed further below, on whose walls the melt can cool and solidify, as long as a sufficiently large flow passage for the melt remains in it.

The first hot channel region 100 has at least one or more hot channel element(s), each provided with a melt channel 101 for the melt.

Figure 2:
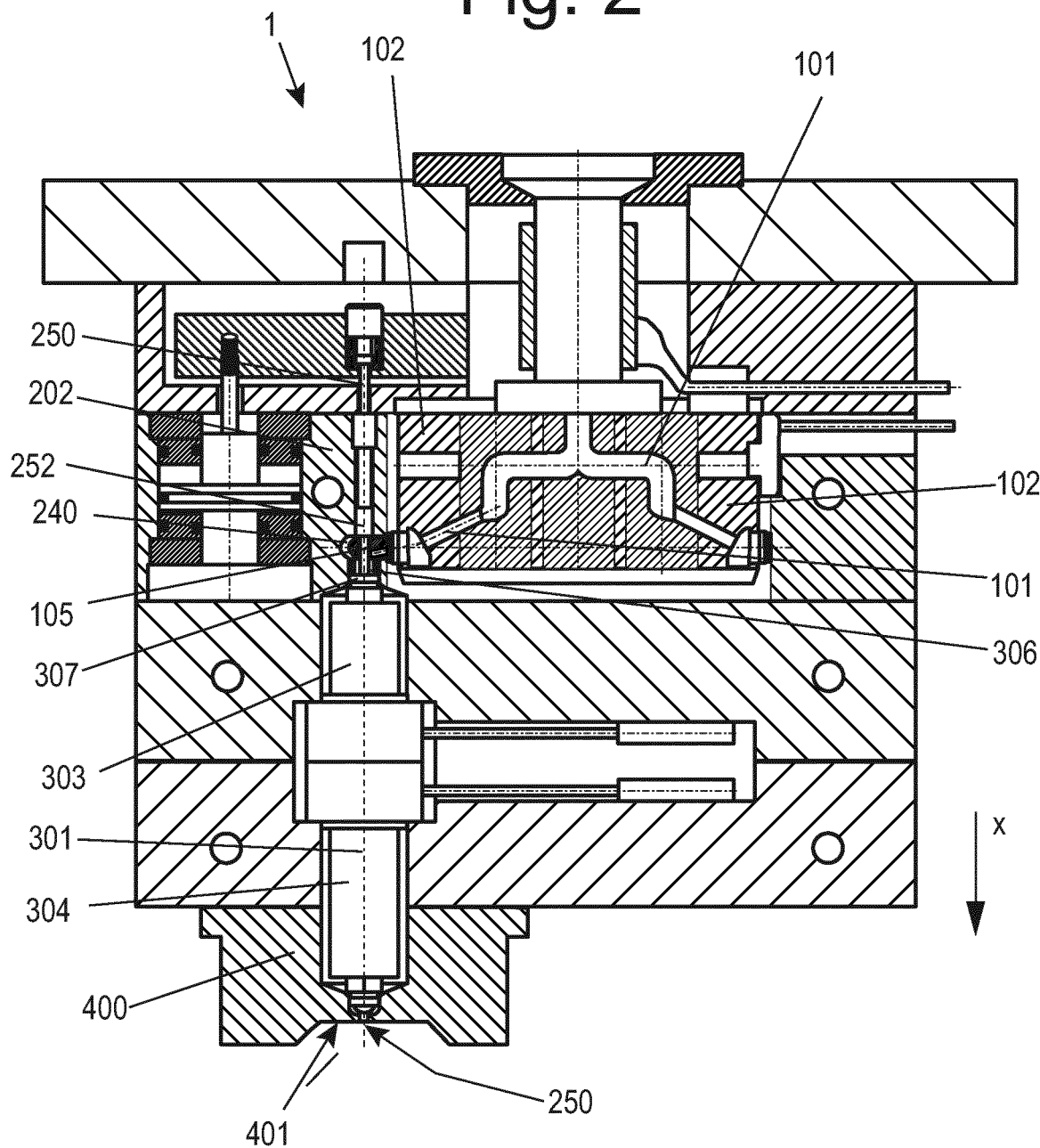
FIG. 2 shows a section of a second hot channel device according to the present disclosure.
Figure 3:
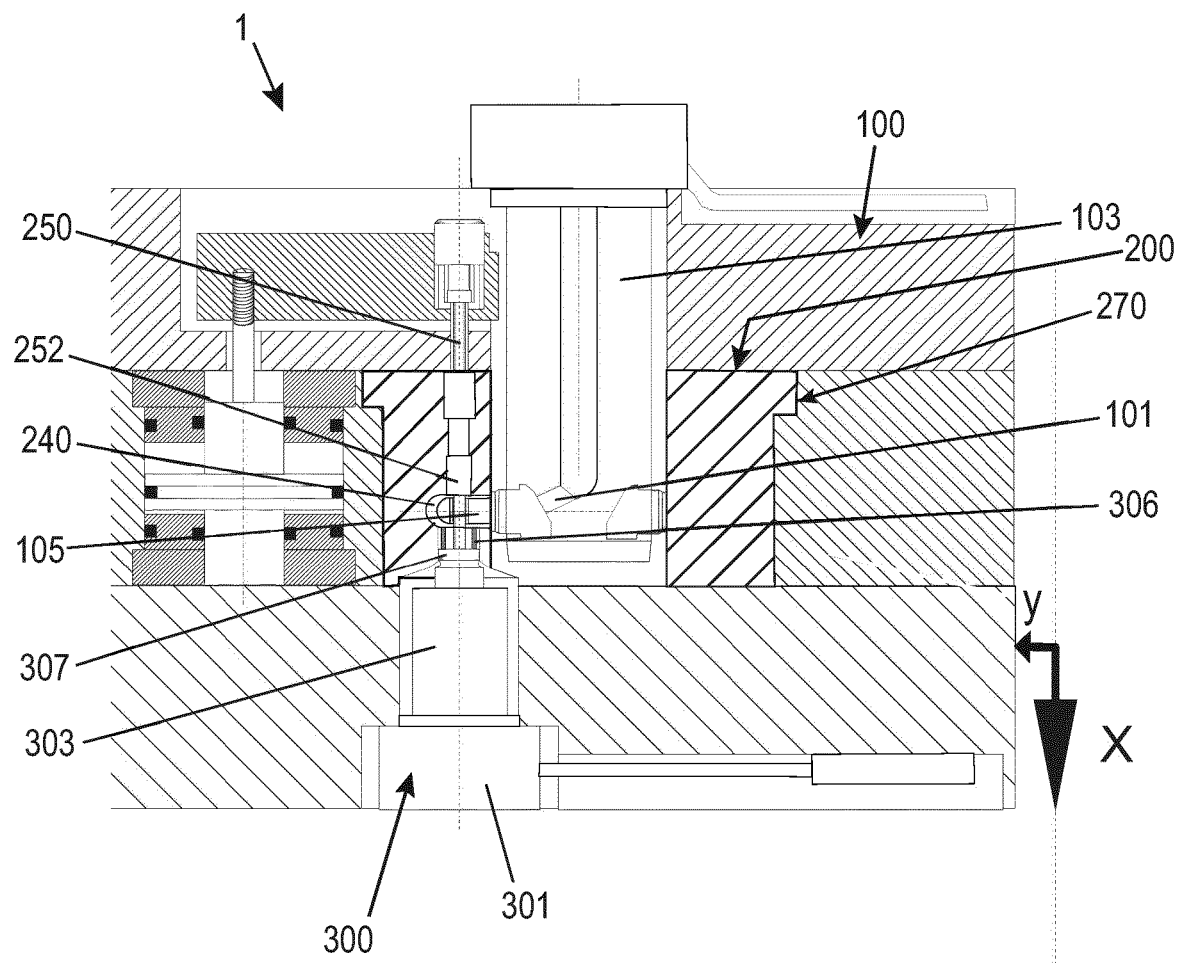
FIG. 3 shows an enlarged section of a variant of the hot channel device from FIG. 1.

These hot channel elements may include at least one or more of the following elements: one or more manifold plates 102 (FIGS. 1, 2, 3, 4) and/or one or more hot channel nozzles 103 (FIGS. 1, 3, 4). The melt channels 101 of these elements then form the melt channel 101 of the first hot channel region 100 when connected in series. In particular, it is also conceivable to provide several hot channel nozzles 103 directly or through manifold plates 102 spaced apart one behind the other.

The hot channel elements of the first hot channel region 100 are each designed to be heatable, as otherwise the temperature drop of the melt in the first hot channel region 100 would be so great that the temperature of the melt at the end of the first hot channel region 100 would be too low for the respective application or the subsequent transfer through the subsequent melt transfer sections 200 or hot channel regions 300 and material would solidify in the melt channel 101.

The first hot channel region can—even with only one manifold—especially have a manifold plate 102 with a melt channel 101.

Here the melt channel 101 first extends in a direction X and then shows a deflection from this direction X into a direction Y which is at an angle to it—here at right angles (see also FIG. 2 or FIG. 3).

The second hot channel region 200 has one or more melt channel element(s) 202, each equipped with a melt conducting channel 201 for the melt. These are not called hot channel elements here, as the temperature can be so low, at least in sections, that melt can solidify and settle on the walls of this area.

The melt channel elements 202 can be designed to be heatable, coolable or temperature-controllable—provided the above-mentioned requirements are met.

A plate 202 which is provided with the melt conducting channel 201 is especially suitable as the at least one melt channel element 202 of the melt transfer region 200, especially a coolable or temperature-controlled mold insert 270 (FIG. 2, FIG. 3).

An inlet of the melt transfer chamber 240 of the melt transfer region 200 is angled, especially at right angles, to the outlet of the melt channel 101 of the first hot channel region 100.

Figure 4B:
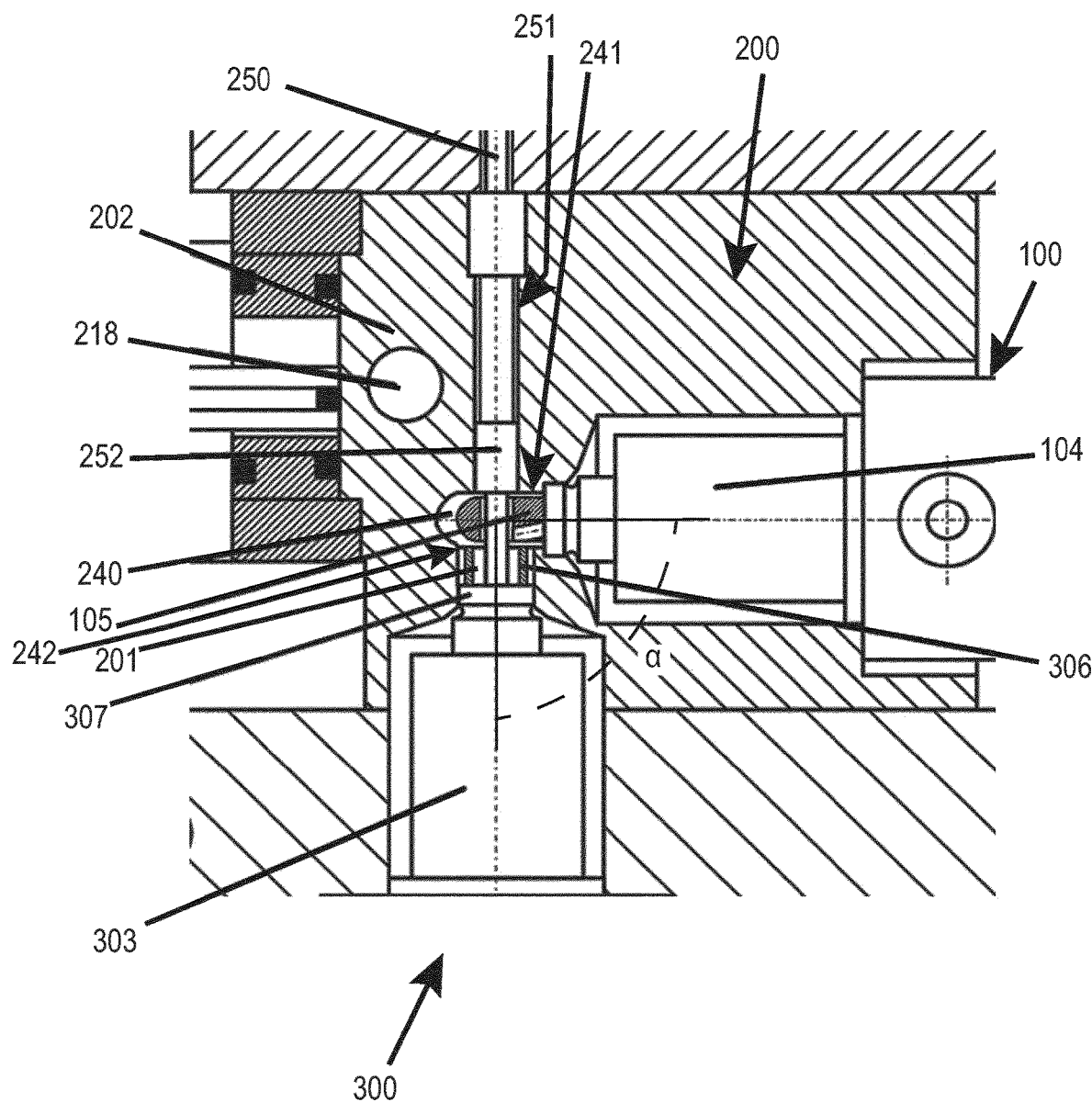

The inlet of the melt conducting channel 201 is also preferably designed as an unheated melt transfer chamber 240 (see also FIG. 4b). A melt conducting element 105 of the first hot channel region 100 can extend into the melt transfer chamber 240. This does not necessarily touch the melt channel elements 202. The melt conducting element 105 may be hot enough to keep a flow passage free for melt in the melt transfer chamber. The melt conducting element 105 can be designed as a kind of tip insert of the hot channel nozzle 103 or 104.

The melt transfer chamber 240 has an inlet 241 for the melt and an outlet 242 for the melt (FIG. 4b). The melt conducting element 105 can extend into inlet 241.

The inlet 241 for the melt and the outlet 242 for the melt are not parallel, but are oriented at an incline to each other or at an angle to each other. This angle α is not zero. The angle α is preferably between 15° and 160°, especially at 90°. Here the inlet extends in direction Y. The outlet, however, extends in direction X.

The melt transfer chamber 240 is penetrated by a needle 250. This needle 250 is slidingly guided in a needle channel 251, which opens into the melt transfer chamber 240 and is continued in alignment in the outlet channel 242. Since the needle is formed in a straight way, this means here that the needle channel 251, the needle 250 and the outlet channel 242 extend in direction X.

A needle seal 252 is arranged in an annular space between the needle 250 and the inner wall of the needle channel 251. This needle seal 252 can be made of various materials, e.g. a steel alloy. It can be designed as a sleeve.

Melt material can collect in the annular gaps inside and outside the needle seal 252. As this can remain there for a relatively long time, it is important to prevent carbonization of this material, as this can lead to sluggishness or blockage of needle 250.

The melt transfer chamber 240 is or will be penetrated—in particular by cooling bores or cooling channels 218 (FIGS. 4a and b), through which a cold or tempered fluid can be passed, so that on the inner wall of the melt transfer chamber 240 and in the sealing gap of the seal 252 towards the needle 250 and towards the needle channel 251, no liquid melt, in particular no liquid plastic, is present during operation of the hot channel device, but that a solidifying "thin" plastic layer is formed from the melt.

In this way, the annular gaps are sealed at the needle seal 252. Due to the lower temperature, it is ensured that no further melt deposits can occur in the sealing gaps during operation—apart from a short period after initial start-up—and that no carbonizations can occur. This ensures that the needle remains easily movable and generally does not jam.

The needle is driven by a needle drive 260 and is held in a drive plate 261 which moves parallel to the mold opening direction X.

The needle drive 260 is embodied here as a hydraulic or pneumatic drive and can actuate several needles 250 simultaneously via the drive plate 261. This needle drive can be electrically driven in a different embodiment. Each needle can have its own needle drive 260, which can be driven electrically, hydraulically or pneumatically. The needle drive 260, especially the electrically driven needle drive 260, can be embodied in such a way that different needle positions can be approached besides the fully closed and fully open position.

The intermediate positions of the needle can be used, for example, to regulate the melt flow during the injection process. The needle can also be moved at different speeds. Here, different speeds from one needle position to the next needle position are possible. It is possible to control or regulate an acceleration curve between one needle position and the next needle position. It is also possible to readjust the needle end positions between the injection processes. The regulation of the needle position is made possible by a control loop. Various prior-art sensors can be used for regulation so that the needle position is known.

The outlet 242 of the melt transfer chamber 240 opens into the second hot channel section 300, which in turn has at least one or more hot channel element(s) which is/are each provided with a melt channel 301 for the melt.

These hot channel elements can comprise one or more of the following elements: one or more manifold plates (not shown here) and/or one or more hot channel nozzle(s) 303, 304 connected in series. The hot channel bores of these elements then form the melt channel 301 (not shown here) of the second hot channel region 300 in interaction when connected in series. This melt channel 301 is penetrated by the needle 250—in this case up to the mold insert 400. The outlet of this melt channel 301 opens into the gate opening 401 of the mold insert 400.

The needle channel 251, the melt transfer chamber 240 and the melt channel 301 are penetrated by the needle 250, which can be moved within them to a limited extent to open or close the gate opening 401.

In embodiments, the needle seal 252 is or can be cleverly arranged by the selected arrangement in an area of the hot channel device 1 which is cooler than the areas in which liquid melt is present and that the needle movement direction can still be the same as the mold opening direction.

The hot channel elements 102, 103, 104 as well as 303, 304, 307 of the first and second hot channel region 100, 300 can each be formed in a heatable manner. This applies in particular if the temperature drop of the melt in the first or second hot channel region 100, 300 would otherwise be so great that it would solidify at the edge of the hot channel 100, 200. In the second hot channel region 300 in particular, a heating device—preferably one or more hot channel nozzles 303, 304—is usually necessary to supply the melt with heat after it has flowed through the melt transfer chamber 240, in order to heat it up again or at least to prevent it from cooling down further.

Due to the selected arrangement in the area of the needle seal 252, lower temperatures, in particular a considerably lower temperature, can prevail during operation and also prevails than in the melt channel 101, 301.

The melt transfer chamber 240 and the entire melt transfer region 200 can be configured in such a way that during operation only temperatures below the glass transition temperature or below the crystallite melting temperature of the melt occur at the needle seal 252. In embodiments, the temperatures are more than 40° C., and in some embodiments, more than 60° C., below this temperature. In this way, deposits on the needle 250 can be avoided very reliably.

In this way, the needle 250 is easily protected in the area of the needle seal 252 against deposits that can occur due to excessive temperatures in the sealing gaps and the resulting carbonization of the melt.

The melt can be discharged from the melt transfer chamber 240, for example, by means of a rear hot channel nozzle 303 which is sealingly immersed in the chamber 240 with a sleeve 306 (FIGS. 1, 2, 3, 4). To improve temperature control, this can also have a heat conducting sleeve 307. By means of this arrangement, the needle 250 can be guided through the needle seal 252 mounted in the temperature-controlled (cold) area of the mold structure and the adjacent hot channel components or hot channel elements in the axis of the mold opening movement X to the gate opening 401. How the further melt guidance is to be configured generally depends on the individual application. For example, the rear-immersing, melt-diverting nozzle 303 can be designed both in the direction of the mold insert 400 (cavity 413) and as a so-called nest nozzle, so that only one hot channel component is present in the melt-diverting strand.

In an embodiment, it may be provided to design a region of the melt transfer chamber 240 as a mold insert 270 in the manner of a ring-shaped melt conducting plate 202, since all relevant dimensional adjustments of the sealing passages in a component of the melt transfer region 200 can be made with it (FIG. 3).

The present disclosure—exemplified in FIGS. 1 to 4—makes it possible to guide the needle 250 movably in melt channel 301, which is usually under high pressure and high temperature (200 MPa and more as well as >200° C.).

This concept of the "cold needle seal" has the advantage that no carbonization takes place and a practically leakage-free sealing situation is created in which the polymer entering during initial start-up acts as an additional gap filling and the thin polymer layer acts as a sealing and sliding film. This also minimizes wear between needle seal 252 and needle 250.

According to the present disclosure, the needle seal 252 can be mounted in any area of the mold 500, since it is used for lateral melt transfer into a hot channel component that carries the melt away, for example the rear hot channel nozzle 303, wherein a melt transfer region 200 with the melt transfer chamber 240 is installed at a suitable location in a plate 202 of the mold construction 500, into which both the heat conducting element 105 of the hot channel nozzle 103 to be fed and the hot channel component 303 which carries away the melt and in particular the needle seal 252 open.

Following the hot channel component which carries the melt away, for example rear hot channel nozzle 303, a second hot channel nozzle 304 can be installed, with which the mold insert 400 can be reached in the usual way. The needle 250 guided through the "cold needle seal" 252 can thus be guided unhindered through the hot channel component 303, which carries the melt away, and the second hot channel nozzle 304 up to the gate opening 401, and the needle movement can thus take place without restriction in mold opening direction X.

This makes the principle of the "cold needle seal" universal, since with the additional second hot channel nozzle 303, 304, every cavity 413 can be reached in the usual way.

In a simpler version of the embodiment of FIG. 1, as shown in FIG. 2, the feeding nozzle 103 or 104 can also be dispensed with and the lateral melt outlet can be a direct component of the heated manifold or a corresponding heated manifold plate 102.

In a further embodiment according to FIGS. 4a and b, the lateral melt outlet from manifold 102 can be extended by a heated third hot channel nozzle 104, here aligned perpendicular (or at a certain angle α) to direction X.

The nozzle 103 or the nozzle 104 or the manifold 102 each feed into the laterally accessible, preferably unheated melt transfer chamber 240 in the mold 500, into which the needle 250 is immersed in the axis of the mold opening movement X. The melt transfer chamber 240 as well as the needle seal 252 are temperature-controlled through cooling holes or cooling channels 218 in such a way that no liquid plastic is present on the inner wall of the melt transfer chamber 240 and in the sealing gap of the seal 252, but that a thin, still soft but not liquid plastic layer is formed.

Appropriately temperature-controlled here means a temperature level well below the glass transition temperature or the crystallite melting temperature. Examples: Polystyrene (amorphous): hot channel temperature 180° C. to 260° C., mold temperature of the melt transfer region 200 10° C. to 60° C., glass transition temperature approx. 100° C. or polyamide (semi-crystalline): hot channel temperature 280° C. to 300° C., mold temperature of the melt transfer region 200 60° C. to 80° C., crystallite melting temperature 260° C. to 275° C. or polyacetal (POM) (semi-crystalline): hot channel temperature 190° C. to 210° C., mold temperature of the melt transfer region 200 80° C. to 100° C., crystallite melting temperature 175° C. to 178° C.

In embodiments, the temperature of the needle seal 252 is below the softening range, i.e., as described above, below the glass transition or crystallization range.

In this case, the needle seal 252 is located in a relatively cold area of the mold, so that the polymer that has entered the gap of the seal during the initial filling of the system is not exposed to any temperature that would cause significant degradation.

The needle seal 252 only experiences a certain temperature increase through the heat conduction of the needle 250 and through the melt in the melt transfer chamber 240, but this is so low that no "cracking" occurs. Rather, this temperature increase (below the softening point) leads to better sliding behavior of the needle in the seal.

In contrast to conventional sealing concepts (seal in the hot manifold), the needle seal does not determine the maintenance interval of a mold in any of the applications illustrated with the valve gate technology.

The invention claimed is:

1. Hot channel device for conveying incoming hot melt to a gate opening of a mold insert of a mold, which gate opening can be opened and reclosed by a movable needle, wherein the hot channel device has a first hot channel region with a coolable melt transfer region and a second hot channel region, which are arranged one behind the other in the flow direction of the melt in the direction of the mold insert, characterized in that the coolable melt transfer region has a melt transfer chamber through which the needle passes, which is displaceably guided in a needle channel in a sealed manner with a needle seal, and the needle channel is continued in alignment in a melt channel of the second hot channel region, wherein a melt conducting element of the first hot channel region projects into the melt transfer chamber without touching the melt transfer chamber.

2. Hot channel device according to claim 1, wherein the melt transfer chamber has an inlet for the melt and an outlet channel for the melt which is not parallel thereto but is arranged at an angle, in particular at a right angle, thereto, wherein the melt transfer chamber is penetrated by the needle, wherein the needle channel opens into the melt transfer chamber at an angle to the inlet and is continued in alignment in the outlet channel and in the melt channel of the second hot channel region up to the gate opening.

3. Hot channel device according to claim 1, wherein the melt in the first hot channel region is deflected from a first direction and fed into the melt transfer chamber, and wherein the melt in the first hot channel region leaves said chamber again deflected in the direction of the second hot channel region.

4. Hot channel device according to claim 3, characterized in that the first direction is the mold opening direction.

5. Hot channel device according to claim 1, wherein the melt conducting element of the first hot channel region is configured to be exchangeable.

6. Hot channel device according to claim 1, wherein the melt transfer chamber is configured to be temperature-controlled in such a way that on the inner wall of the melt transfer chamber and in the transition to a sealing gap on the needle seal towards the needle and towards the needle channel, no liquid melt is present during operation, but that a solidifying plastic layer is formed from the melt.

7. Hot channel device according to claim 1, wherein the melt transfer chamber can be temperature-controlled such that the temperature in sealing gaps of the needle seal is below the glass transition temperature or below the crystallite melting temperature of the melt.

8. Hot channel device according to claim 1, wherein in the first hot channel region and in the second hot channel region the temperature is controlled or regulated in such a way that the respective incoming melt remains liquid and does not solidify on any walls, whereas in the melt transfer region the temperatures are kept lower in an edge region of the melt transfer chamber, so that melt can also solidify in the edge region of the melt transfer chamber, wherein a flow passage for the melt into the second hot channel region remains.

9. Hot channel device according to claim 1, wherein the first and second hot channel regions each have at least one or more hot channel elements each provided with a melt channel for the melt.

10. Hot channel device according to claim 9, wherein the hot channel elements comprise at least one or more of the following elements: one or more manifold plates and one or more hot channel nozzles.

11. Hot channel device according to claim 9, wherein one or more of the hot channel elements of the first hot channel region and the second hot channel region are heatable.

12. Hot channel device according to claim 1, wherein a melt channel element of the melt transfer region has at least one or more cooling channels for a fluid flowing through.

13. Hot channel device according to claim 1, wherein a melt channel element of the melt transfer region is configured as a mold insert.

14. Hot channel device according to claim 1, wherein a hot channel nozzle designed for lateral gating projects into a melt channel element of the melt transfer region.

15. Hot channel device according to claim 1, wherein the design of the melt transfer chamber and the entire melt transfer region is controllable in such a way that only temperatures which are more than 15° C. below the glass transition temperature or below the crystallite melting temperature of the melt occur at the needle seal in sealing gaps thereof.

16. Hot channel device according to claim 1, wherein the discharge of the melt from the melt transfer chamber into the second hot channel region is effected by a rear hot channel nozzle sealingly immersed in this chamber with a sleeve.

17. Hot channel device according to claim 16, wherein the rear hot channel nozzle has a heat conducting sleeve.

18. Hot channel device according to claim 16, wherein the rear hot channel nozzle is configured in the direction of the mold insert as a nest nozzle.

19. Hot channel device according to claim 16, wherein a sliding seal is provided between the melt transfer chamber and the rear hot channel nozzle.

20. Hot channel device according to claim 1, wherein the second hot channel region has a hot channel nozzle with a rear seal to the melt transfer chamber and a front seal to the mold insert.

21. Method for operating a hot channel device for conveying incoming hot melt to a gate opening of a mold insert of a mold, which gate opening can be opened and reclosed by a movable needle, wherein the hot channel device has a first hot channel region with a coolable melt transfer region and a second hot channel region, which are arranged one behind the other in the flow direction of the melt in the direction of the mold insert, characterized in that the coolable melt transfer region has a melt transfer chamber through which the needle passes, which is displaceably guided in a needle channel in a sealed manner with a needle seal, and the needle channel is continued in alignment in a melt channel of the second hot channel region, wherein a melt conducting element of the first hot channel region projects into the melt transfer chamber without touching the melt transfer chamber, wherein an injection molding melt is fed into the hot channel device and through this to the mold insert,
  a) the first hot channel region is temperature-controlled above the glass transition temperature or above the crystallite melting temperature of the melt,
  b) and the subsequent melt transfer region is temperature-controlled below the glass transition temperature or below the crystallite melting temperature of the melt, wherein a flow passage for the melt is maintained in the melt channel,
  c) and the subsequent second hot channel region is temperature-controlled above the glass transition temperature or above the crystallite melting temperature of the melt.

22. Method according claim 21, wherein the melt transfer region is temperature-controlled in such a way that a temperature prevails in sealing gaps of the needle seal which is more than 15° C. below the glass transition temperature or below the crystallite melting temperature.

23. Method according to claim 21, wherein the melt transfer region is tempered in such a way that a solidifying plastic layer forms on an inner wall of the melt transfer chamber and in the transition to a sealing gap at the needle seal towards the needle and towards the needle channel during operation.

24. Hot channel device according to claim 1, wherein the melt conducting element of the first hot channel region temperature-controls a temperature in the melt channel for the melt to flow through the melt transfer chamber.

25. Method according to claim 21, wherein the first and the second hot channel regions as well as the melt transfer region are each operated to transfer the melt, wherein the temperature in the first hot channel region and in the second hot channel region are controlled or regulated such that the respective incoming melt remains well fluid and does not solidify on walls, whereas in the melt transfer region the temperatures are kept so low, at least in some areas, especially in an edge region of the melt transfer chamber, that melt can also solidify in the edge region thereof, wherein a flow passage remains for the melt into the second hot channel region.

* * * * *